(12) United States Patent
Waters et al.

(10) Patent No.: US 7,961,826 B2
(45) Date of Patent: Jun. 14, 2011

(54) PARAMETERIZED SPHERE DETECTOR AND METHODS OF USING THE SAME

(75) Inventors: Deric W. Waters, Dallas, TX (US); Oren Peles, Rehovot (IL); Anuj Batra, Dallas, TX (US); Srinath Hosur, Plano, TX (US); Doron Burshtein, Ramat-Efal (IL)

(73) Assignee: Texas Instruments Incorporated, Dallas, TX (US)

( * ) Notice: Subject to any disclaimer, the term of this patent is extended or adjusted under 35 U.S.C. 154(b) by 836 days.

(21) Appl. No.: 11/928,863

(22) Filed: Oct. 30, 2007

(65) Prior Publication Data

US 2008/0144746 A1 Jun. 19, 2008

Related U.S. Application Data

(60) Provisional application No. 60/869,963, filed on Dec. 14, 2006.

(51) Int. Cl.
*H04B 7/10* (2006.01)
*H04L 1/02* (2006.01)
(52) U.S. Cl. .................................... 375/347; 375/340
(58) Field of Classification Search .................. 375/260, 375/262, 267, 341, 346–347, 349
See application file for complete search history.

(56) References Cited

U.S. PATENT DOCUMENTS

| | | | |
|---|---|---|---|
| 6,662,024 B2 | 12/2003 | Walton et al. | |
| 6,757,337 B2 | 6/2004 | Zhuang et al. | |
| 6,859,689 B2 | 2/2005 | Vos | |
| 7,116,725 B2 | 10/2006 | Ketchum et al. | |
| 7,123,887 B2 | 10/2006 | Kim et al. | |
| 7,308,047 B2* | 12/2007 | Sadowsky | 375/324 |
| 7,443,928 B2* | 10/2008 | Nefedov et al. | 375/323 |
| 7,457,376 B2* | 11/2008 | Sadowsky | 375/324 |
| 7,596,191 B2* | 9/2009 | Son et al. | 375/341 |
| 2005/0135498 A1* | 6/2005 | Yee | 375/267 |
| 2005/0210039 A1* | 9/2005 | Garrett | 707/100 |

OTHER PUBLICATIONS

Barry, J. R. et al., Digital Communication, 3rd edition, Kluwer Academic Publishers, 2004, Chapter 10, Section 3, pp. 517-521.
Chan, A. et al., "A new reduced-complexity sphere decoder for multiple antenna systems," IEEE Conference on Communications, pp. 460-464, 2002.
Foschini, G. J. et al., "Simplified processing for wireless communication at high spectral efficiency," IEEE J. Selected Areas in Communication, vol. 17, No. 11, pp. 1841-1852, 1999.
Hochwald, Bertrand M. et al., "Achieving Near-Capacity on a Multiple-Antenna Channel," IEEE Transactions on Communications, vol. 51, No. 3, Mar. 2003, pp. 389-399.
Love, D. J.; et al., "Space-time Chase decoding," IEEE Transactions on Wireless Communications, vol. 4, No. 5, pp. 2035-2039, Sep. 2005.
Waters, Deric, "Signal Detection Strategies and Algorithms for Multiple-Input Multiple-Output Channels," A Thesis Presented to the Academic Faculty, Georgia Institute of Technology, Dec. 2005, 122 pages. Found at: http://smartech.gatech.edu/handle/1853/7514.
Wubben, D. et al., "Efficient Algorithm for Decoding Layered Space-Time Codes," Electronics Letters, Oct. 25, 2001, vol. 37, No. 22, pp. 1348-1350.
Zhao, W. et al., "Sphere decoding algorithms with improved radius search," IEEE Communications and networking Conference, vol. 4, p. 2290-2294, Mar. 2004.

* cited by examiner

*Primary Examiner* — Jean B Corrielus
(74) *Attorney, Agent, or Firm* — Steven A. Shaw; W. James Brady; Frederick J. Telecky, Jr.

(57) ABSTRACT

A Multiple-input Multiple-Output (MIMO) receiver is provided. The MIMO receiver comprises a parameterized sphere detector having two search modes. During a first search mode, the parameterized sphere detector enumerates a number of best candidate vectors up to a fixed parameter value. During a second search mode, the parameterized sphere detector enumerates additional candidate vectors using a greedy search until a predetermined number of candidate vectors have been enumerated.

17 Claims, 9 Drawing Sheets

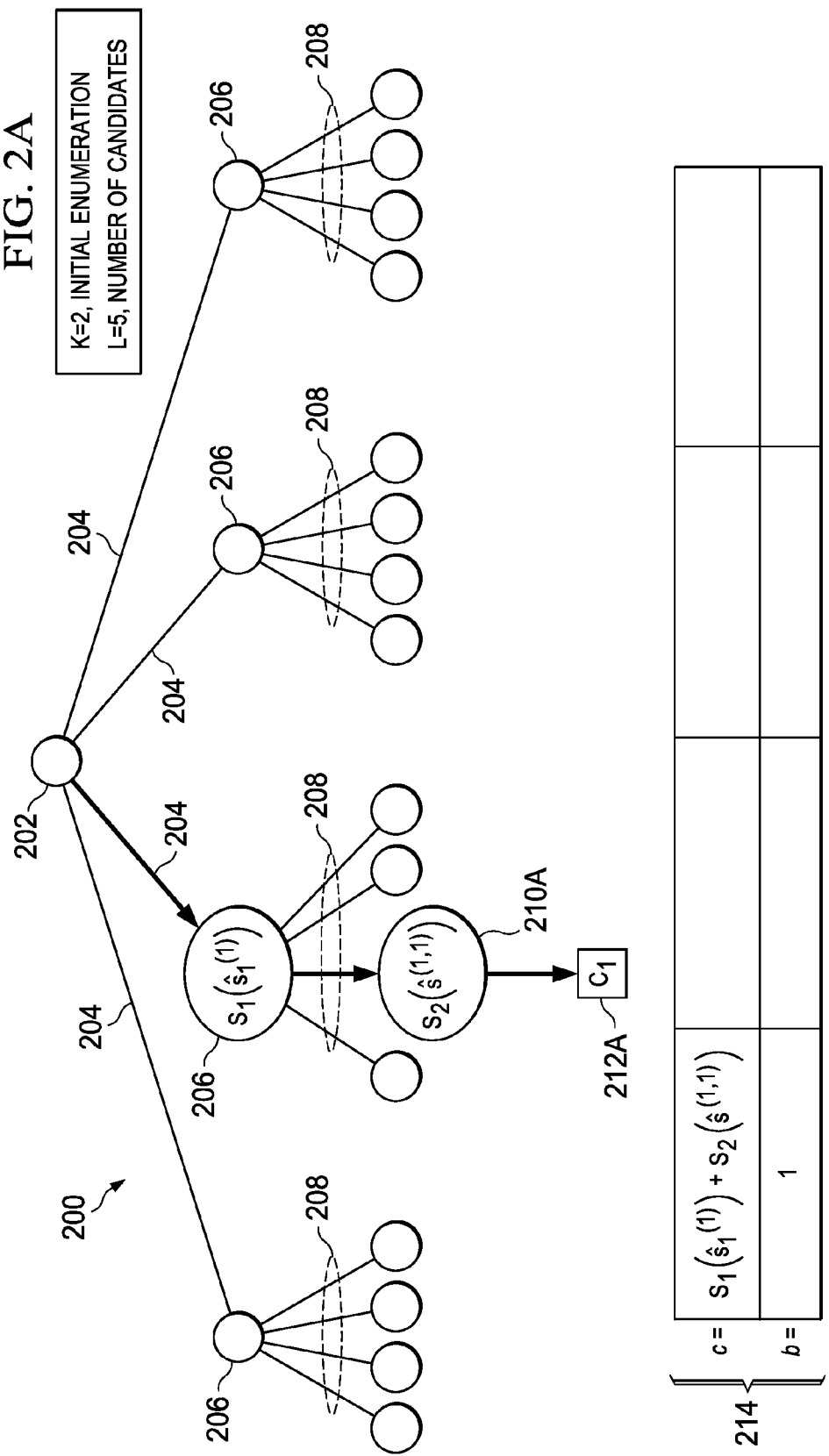

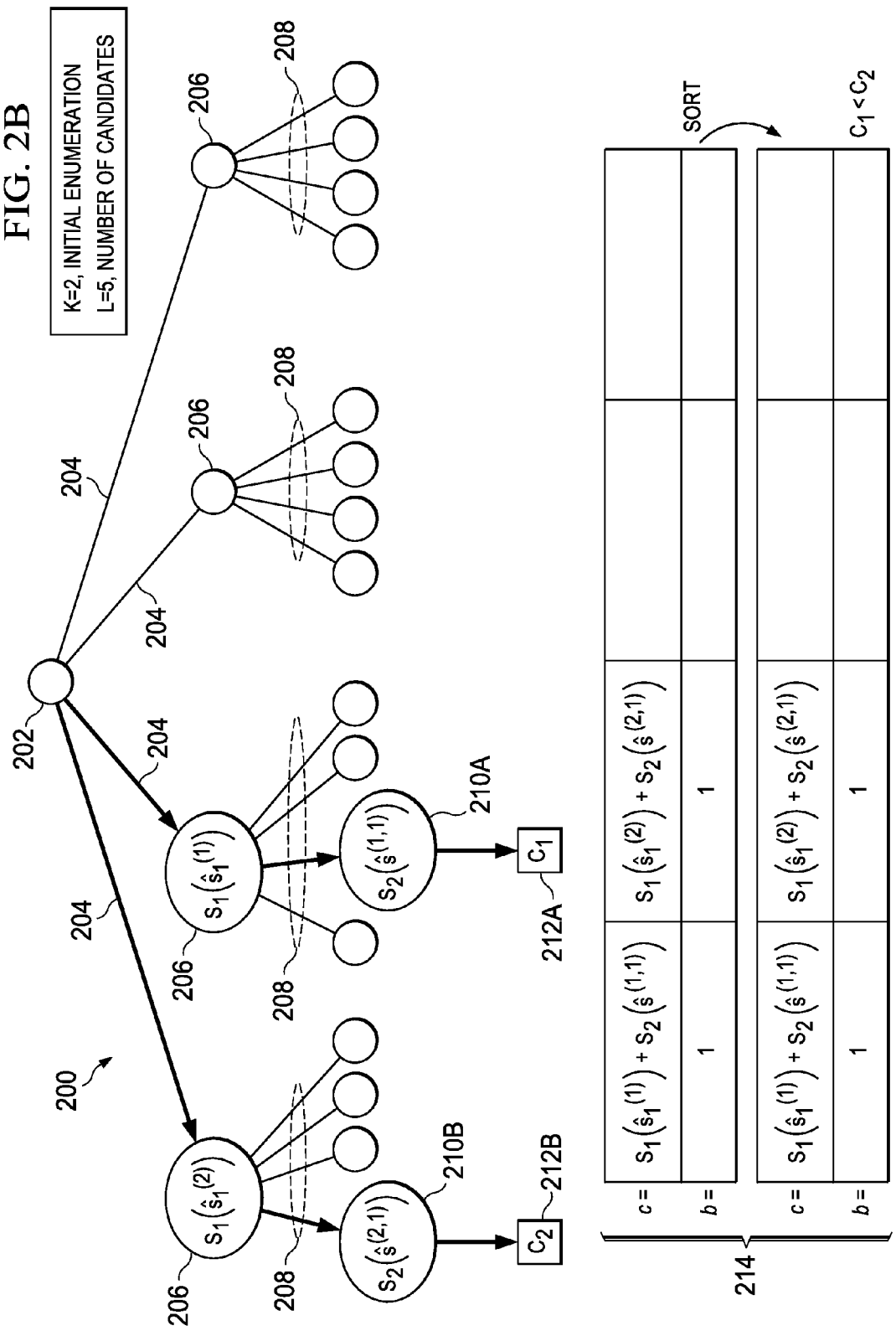

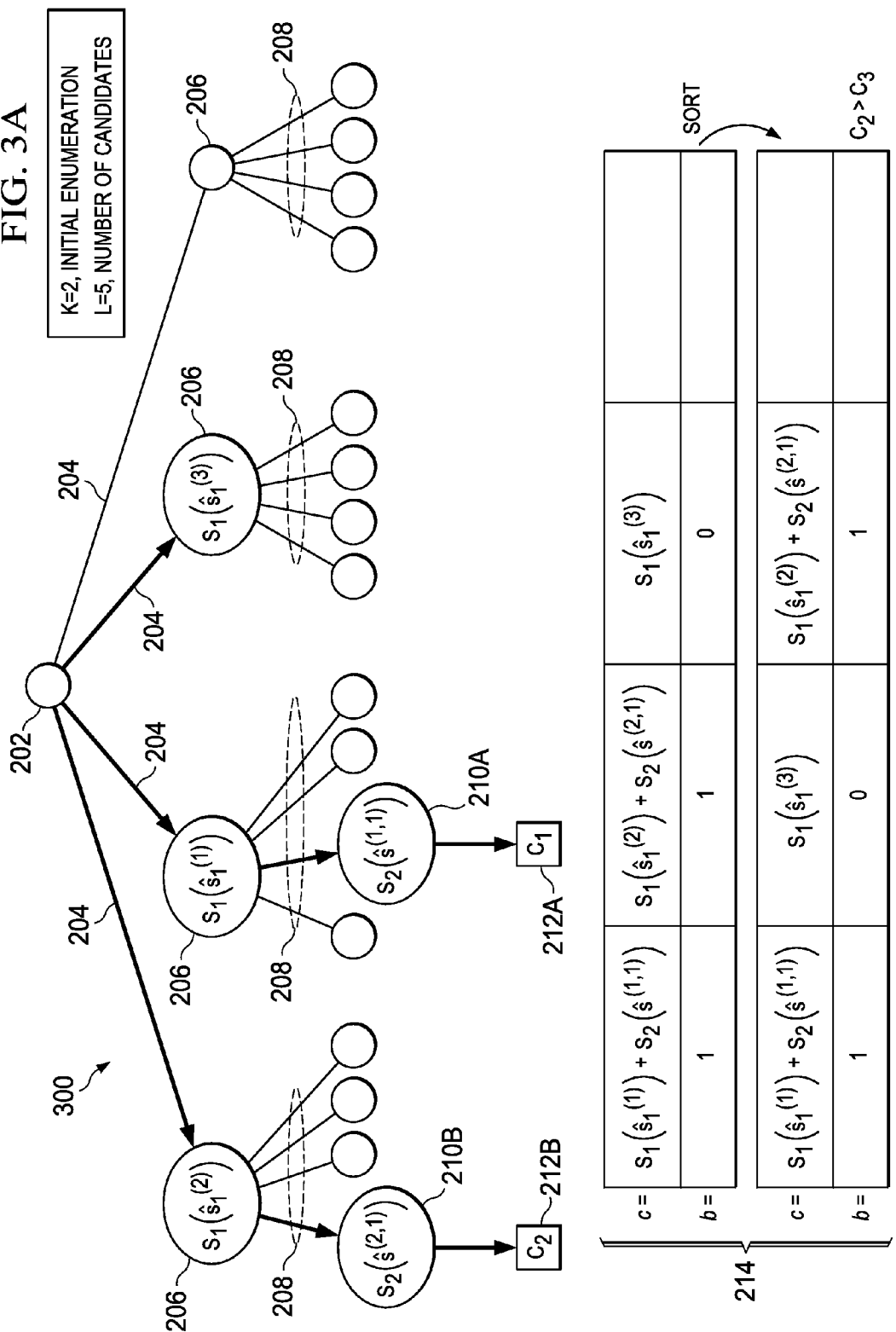

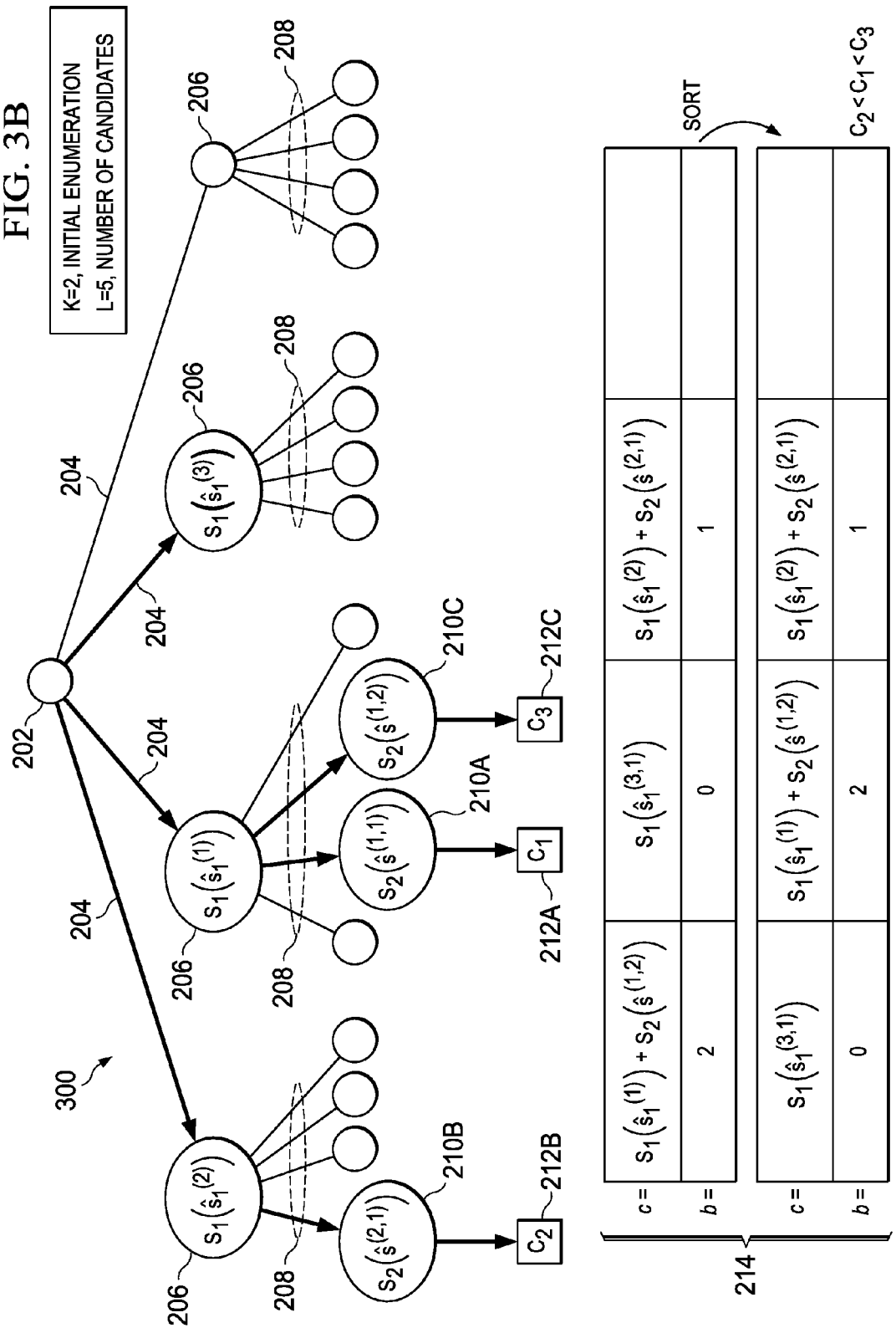

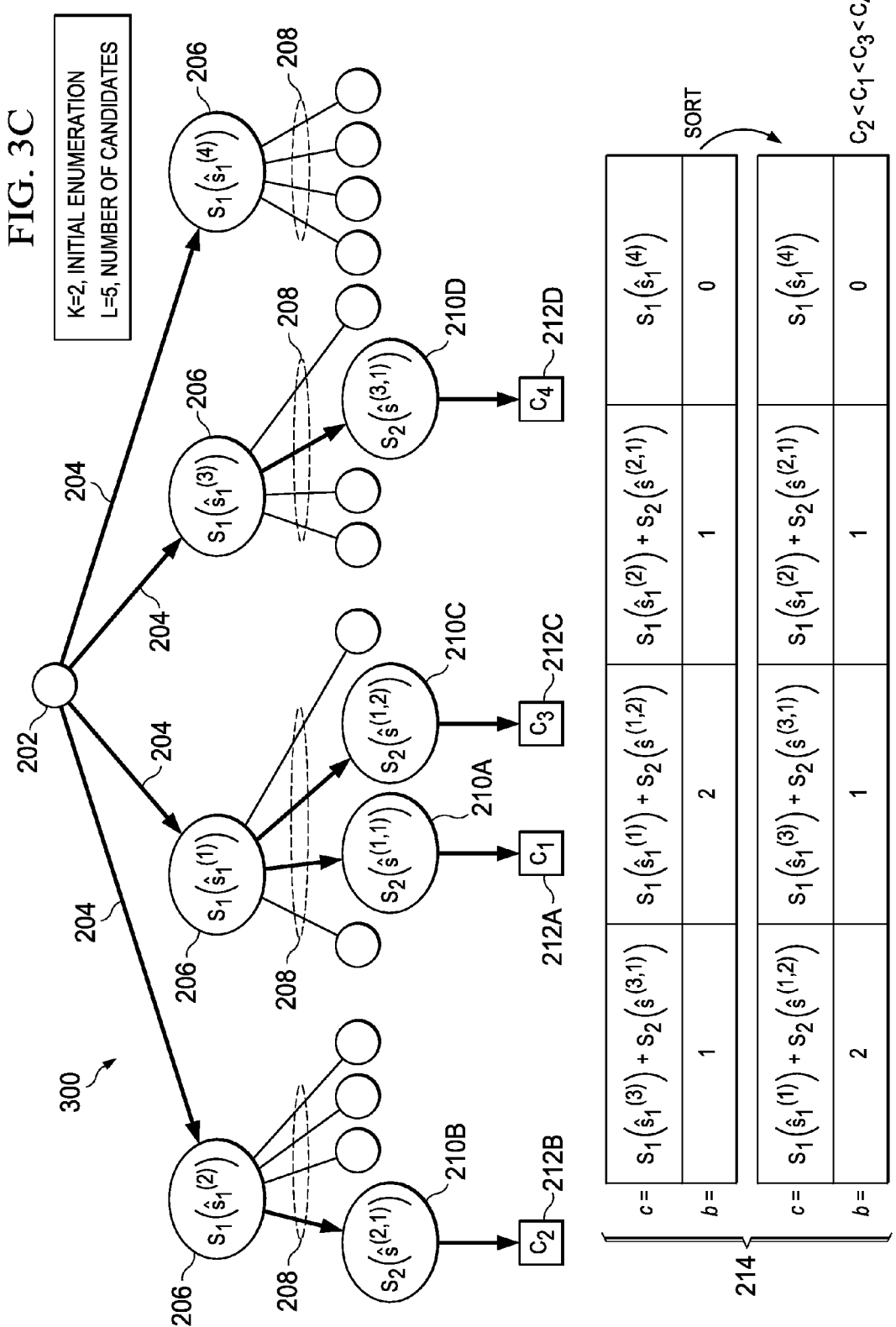

PARAMETERIZED SPHERE DETECTOR AND METHODS OF USING THE SAME

CROSS-REFERENCE TO RELATED APPLICATIONS

The present application claims priority to U.S. provisional patent application Ser. No. 60/869,963, entitled "Low-Complexity MIMO Receiver and Method of Using Same", filed on Dec. 14, 2006. The above-referenced application is incorporated herein by reference.

BACKGROUND

As consumer demand for high data rate applications, such as streaming video, expands, technology providers are forced to adopt new technologies to provide the necessary bandwidth. Multiple-input Multiple-Output ("MIMO") is an advanced radio system that employs multiple transmit antennas and multiple receive antennas to simultaneously transmit multiple parallel data streams. Relative to previous wireless technologies, MIMO enables substantial gains in both system capacity and transmission reliability without requiring an increase in frequency resources.

MIMO systems exploit differences in the paths between transmit and receive antennas to increase data throughput and diversity. As the number of transmit and receive antennas is increased, the capacity of a MIMO channel increases linearly, and the probability of all sub-channels between the transmitter and receiver fading simultaneously decreases exponentially. As might be expected, however, there is a price associated with realization of these benefits. Recovery of transmitted information in a MIMO system becomes increasingly complex with the addition of transmit antennas.

Many MIMO detection algorithms have been proposed. The maximum-likelihood detector, while conceptually simple and exhibiting optimal detection performance, is often impractical because its complexity increases exponentially with the number of input channels. Consequently, a vast assortment of algorithms have been proposed to solve the detection problem with reduced complexity while sacrificing minimal performance. Many MIMO detectors have been proposed exclusively as hard detectors that give only the final estimate of the channel input. Most notable is the sphere detector because it can achieve Max-Log ("ML") performance in an uncoded system with much less complexity on average. A summary of many other previously proposed MIMO detectors is given in Deric W. Waters, Signal Detection Strategies and Algorithms for Multiple-input Multiple-Output Channels (December 2005) (unpublished Ph.D. dissertation, Georgia Institute of Technology), including many variations of the sphere detector that have been proposed to minimize complexity without sacrificing performance. In Bernard M. Hochwald & Stephan ten Brink, *Achieving Near-Capacity on a Multiple-Antenna Channel*, 51 IEEE TRANSACTIONS ON COMMUNICATIONS 389-99 (2003), the list-sphere detector was proposed as a way to compute the log-likelihood ratio (LLR) for the channel input.

SUMMARY

In at least some embodiments, a Multiple-input Multiple-Output (MIMO) receiver is provided. The MIMO receiver comprises a parameterized sphere detector having two search modes. During a first search mode, the parameterized sphere detector enumerates a number of best candidate vectors up to a fixed parameter value. During a second search mode, the parameterized sphere detector enumerates additional candidate vectors using a greedy search until a predetermined number of candidate vectors have been enumerated In other embodiments, a method is provided. The method comprises initializing a parameterized sphere detector to enumerate a fixed number of best candidate vectors before beginning a greedy search. The method further comprises enumerating additional candidate vectors with the greedy search.

BRIEF DESCRIPTION OF THE DRAWINGS

In the following detailed description, reference will be made to the accompanying drawings, in which:

FIGS. 2A-2B show an initialization mode operation for a Primed-Sphere (P-SPH) detector in accordance with embodiments of the disclosure;

FIGS. 3A-3D show a completion mode operation after the initialization mode for the P-SPH detector of FIGS. 2A-2B in accordance with embodiments of the disclosure;

NOTATION AND NOMENCLATURE

Figure 1:
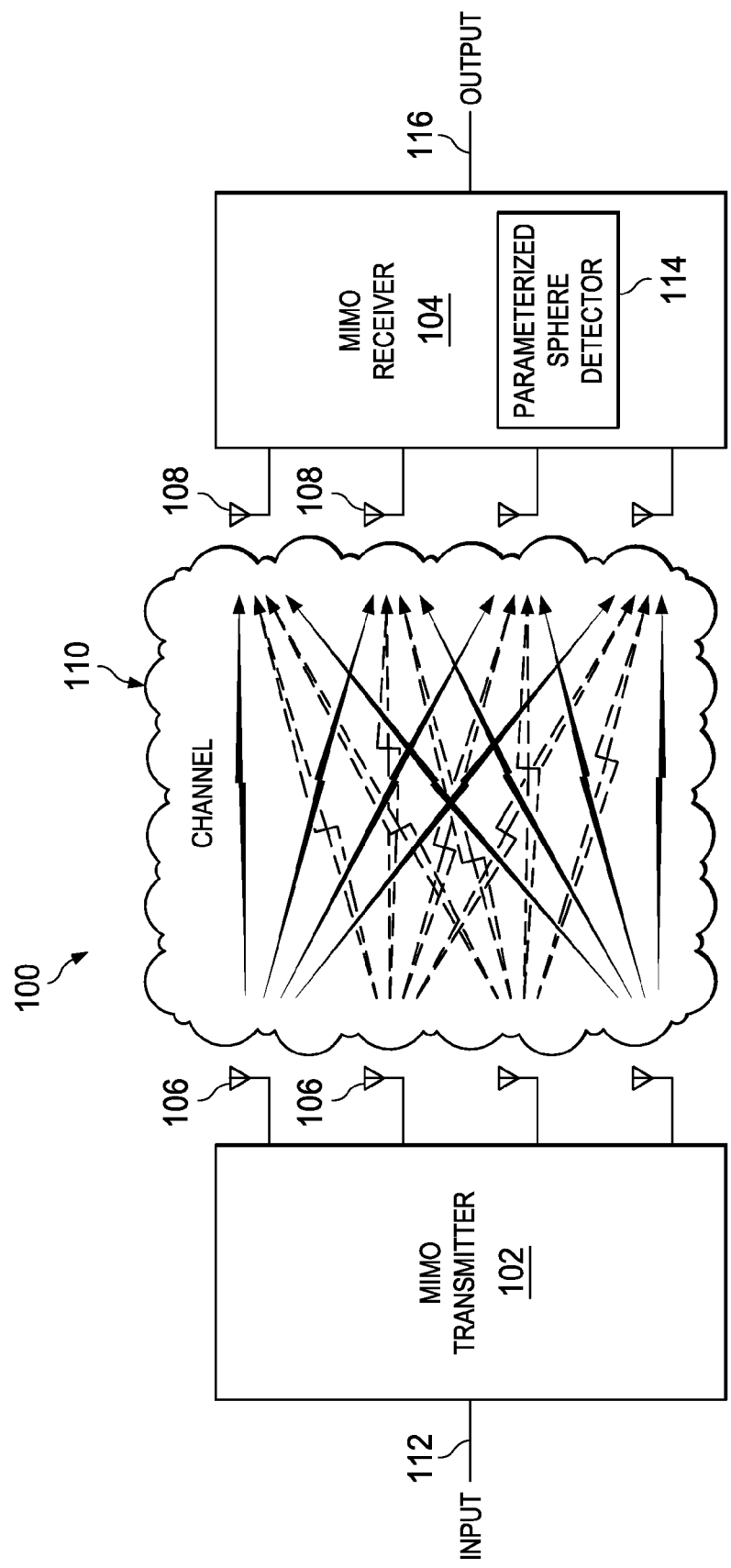
FIG. 1 illustrates a wireless communication system in accordance with embodiments of the disclosure.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . .". The term "couple" or "couples" is intended to mean either an indirect or direct connection. Thus, if a first component couples to a second component, that connection may be through a direct connection, or through an indirect connection via other components and connections. The term "system" refers to a collection of two or more hardware and/or software components, and may be used to refer to an electronic device or devices, or a subsystem thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the disclosure implement a "Parameterized-Sphere" (P-SPH) detector to reduce complexity for many types of (Multiple-input Multiple-Output) MIMO detectors while maintaining the same performance. As used herein, a P-SPH detector refers to a sphere detector configured to search for a fixed number of candidate vectors. In at least some embodiments, the P-SPH detector operates in an initialization mode and in a completion mode to enumerate a fixed number of candidate vectors. During the initialization mode, the P-SPH detector enumerates a fixed number of "best" candidate vectors based on a parameter ("K"). For example, the best candidate vectors can be determined using "cost" and "score" calculations of a greedy tree-search algorithm as will be described herein. During the completion mode, the P-SPH detector enumerates additional candidate vectors, based on a parameter ("L"), until a fixed number of additional candidate vectors have been enumerated. In at least some embodiments, the additional candidate vectors are enumerated using a greedy search that starts with the leaf node having the lowest cost as determined during the initialization mode. In different embodiments, P-SPH detector can be configured to approximate a truncated-sphere detector, a max-log detector, or a decision-feedback detector.

FIG. 1 shows an illustrative embodiment of a wireless communication system 100 in accordance with embodiments of the invention. As shown, the wireless communication system 100 comprises a MIMO transmitter 102 having at least one antenna 106 for transmitting radio frequency signals received as input 112. As shown, the MIMO transmitter 102 transmits radio frequency signals to the MIMO receiver 104 through a channel 110. The MIMO receiver 104 has at least one antenna 108 for receiving transmitted radio frequency signals. The MIMO transmitter 102 and the MIMO receiver 104 may represent fixed or portable wireless devices, cellular phones, personal digital assistants, wireless modem cards, or any other combination of devices configured to transmit and receive signals of a MIMO wireless network.

While MIMO systems may greatly increase spectral efficiency, the process of separating signals simultaneously transmitted from multiple antennas 106 may be burdensome for the MIMO receiver 104. To reduce the computational burden of separating signals, the MIMO receiver 104 implements a P-SPH detector 114 to determine a fixed number of candidate vectors, which are used to detect symbols (i.e. generate symbol estimates). The detected symbols are used to decode bits of a received signal. After decoding a signal, the MIMO receiver 104 can provide an output 118, which includes the decoded signal.

A MIMO narrowband channel model with N inputs $a=[a_1 a_2 \ldots a_N]^T$ and M outputs $r=[r_1, \ldots r_M]^T$ can be written as:

$$r=Ha+w, \quad \text{(Equation 1)}$$

where H is a complex M×N matrix and $w=[w_1 \ldots w_M]^T$ is noise. The noise has the autocorrelation matrix $E[ww^*]=\Sigma^2$. This disclosure focuses on the case where $\Sigma^2=I\sigma^2$, where I is the N×N identity matrix and where $\sigma^2$ is the variance of the noise. Those skilled in the art will recognize that the concepts are extendable to more general cases.

For example, the channel output could be left multiplied by the matrix $\Sigma^{-1}$ to achieve an effective channel whose noise has an identity autocorrelation matrix. This equation also applies to a single tone in an Orthogonal Frequency Division Multiplexing (OFDM) or Orthogonal Frequency Division Multiple Access (OFDMA) system after the cyclic prefix has been removed and the FFT has been applied. This equation also applies to single-tap code-division multiple access (CDMA) channels.

In at least some embodiments, the detector/decoder 114 uses a QR decomposition of the channel. This decomposition is defined as follows:

$$\begin{bmatrix} H \\ \alpha\hat{\sigma}I \end{bmatrix}\Pi = \begin{bmatrix} Q \\ \alpha\hat{\sigma}\Pi R^{-1} \end{bmatrix}R = \tilde{Q}R, \quad \text{(Equation 2)}$$

where $\tilde{Q}$ is an (M+N)×N matrix with orthonormal columns, R is an N×N triangular matrix with positive and real diagonals, $\Pi$ is an N×N permutation matrix, $\hat{\sigma}$ is an estimate of $\sigma$, and $\alpha$ is a chosen parameter that is a non-negative real number. A permutation matrix is defined as any matrix with a single element in each row and column that has the value of one, while all other elements have the value zero. This disclosure describes the algorithm assuming a lower triangular R matrix. Alternatively, embodiments can implement an algorithm for an upper triangular R matrix as would be understood by those skilled in the art.

The optimal value of the parameter $\alpha$ depends on the type of MIMO detector that is used. For example, $\alpha=1$ is optimal for a linear receiver because it minimizes the error, $\|R^{-1}Q^H y-s\|^2$. On the other hand, $\alpha=0$ is optimal for a max-log (ML) receiver. When $\alpha=1$, the equalization is called minimum mean-squared error (MMSE) equalization. When $\alpha=0$, the equalization is called zero-forcing (ZF) equalization. Thus, an appropriate parameter can be selected for the detector/decoder 114 depending on whether a MMSE equalizer or a ZF equalizer is being implemented. When $\alpha=0$, the QR decomposition may be simplified to:

$$H\Pi=QR. \quad \text{(Equation 3)}$$

The way the permutation matrix $\Pi$ is defined impacts performance for some MIMO detectors. For example, the BLAST ordering chooses $\Pi$ to maximize the minimum diagonal of R. A less complex way to choose $\Pi$ is the sorted-QR decomposition that attempts to maximize $R_{1,1}$ (lower triangular R).

The MIMO detector problem can be transformed into an easier problem by creating an effective channel that is triangular. One way to achieve this uses the conjugate transpose of Q as follows:

$$y=Q^H r=Rs+n, \quad \text{(Equation 4)}$$

where $s=\Pi^{-1}a=[S_1 S_2 \ldots S_N]^T$ is a permutation of the channel input vector, and n is an effective noise. Note that n may be a function of $\alpha$ when $\alpha \neq 0$. The constellation for the i-th symbol is defined as $s_{k,i} \in A_i$. The set containing all valid values of a subset of the channel inputs is denoted as $A_{N_1}^{N_2}$, which means $[s_{N_1}, S_{N_1+1}, \ldots, s_{N_2}]^T \in A_{N_1}^{N_2}$ where $N_1 \leq N_2$. The set that contains all the elements of any multi-dimensional constellation $A_{N_1}^{N_2}$ whose j-th bit in the i-th symbol have the value k is denoted as $A_{N_1}^{N_2}(k,i,j)$.

The output of an ML detector is the log-likelihood ratio (LLR) of each bit transmitted in the vector s, where the LLR value indicates the probability that a given bit was transmitted as a one or zero. The ML detector output for the j-th bit of the i-th symbol is described by a single equation:

$$\lambda_{i,j}=(\|r-H\Pi s^{(o)}\|^2-\|r-H\Pi s^{(1)}\|^2)/\hat{\sigma}^2, \quad \text{(Equation 5)}$$

where $\|r-H\Pi s^{(k)}\|^2$ is minimized under the constraint that $s^{(k)} \in A_1^N(k,i,j)$. The value $\|r-H\Pi x^{(k)}\|^2$ is defined as the cost of the vector x.

The ML detector may also be defined using the triangular channel model:

$$\lambda_{i,j}=(\|y-Rs^{(o)}\|^2-\|y-Rs^{(1)}\|^2)/\hat{\sigma}^2, \quad \text{(Equation 6)}$$

where $\|y-Rs^{(k)}\|^2$ is minimized subject to the constraints $s^{(k)} \in A_1^N(k,i,j)$, and $\alpha=0$, and where $\Pi$ can be any permutation matrix. Note that $\|y-Rx\|^2=\|r-H\Pi x\|^2$ when $\alpha=0$.

The P-SPH detector 114 is an example of a list detector. A list detector is any detector that generates a list of candidate vectors for the channel input. The set of candidate vectors is labeled as the set $L_S$, and the number of candidates in the set is called the list length. The size of the set $L_S$ is labeled as L. The ML detector is an example of a list detector with an exhaustive list (i.e., $L=A_1^N$ or $L=|A_1^N|$). Alternatively, many list detectors generate their lists to be as small as possible without sacrificing too much performance.

Given the set $L_S$ generated by any list detector, the LLR for the j-th bit of the i-th symbol may be computed in a manner similar to the ML detector in Equations 5 and 6:

$$\lambda_{i,j}=(\|y-Rs^{(o)}\|^2-\|y-Rs^{(1)}\|^2)/\hat{\sigma}^2, \quad \text{(Equation 7)}$$

where $\|y-Rs^{(k)}\|^2$ is minimized subject to the constraints $s^{(k)} \in A_1^N(k,i,j)$ and $S^{(k)} \in L_S$.

An important problem for MIMO detection os finding the vector $\hat{\alpha}$ that maximizes $Pr[y|\alpha=\hat{\alpha}]$ can be written as:

$$Pr[y|\alpha=\hat{\alpha}]=\min_{\hat{a}\in A_1^N}\|y-R\hat{a}\|^2, \quad \text{(Equation 8)}$$

where $A_1^N$ is set of all possible channel inputs. The detection problem of Equation 8 can be fully described in terms of a tree-search. The number of branches exiting the root node corresponds to the number of possible values for the first symbol. Likewise the number of branches exiting the nodes preceding the i-th level corresponds to the number of possibilities for the i-th symbol. In the end, there are $$\prod_{i=1}^{N}|A_i|$$

total leaf nodes in the tree.

The sphere detector is an algorithm that finds the leaf node with the smallest cost in a computationally-efficient manner. The cost of any node is the sum of the scores of all the branches in the path back to the root node, where every branch in the tree is associated with a unique score. The score of a branch exiting a node at the i-th level can be written as:

$$\text{Score}=|z_i-R_{i,i}\hat{s}_i|^2, \quad \text{(Equation 9)}$$

where $\hat{s}=[\hat{s}_1 \ldots \hat{s}_N]^T$ and where $z_i$ is the result of an interference cancellation procedure. The interference cancellation procedure is defined as:

$$z_i = y_i - \sum_{j=1}^{i-1} R_{i,j}\hat{s}_j, \quad \text{(Equation 10)}$$

where $y_i$ is defined by Equation 4, and $[\hat{s}_1 \ldots \hat{s}_{i-1}]^T$ are the symbols from the path that connects the current branch back to the root node. For more information regarding representing detection problems as a tree-search, reference may be had to J. R. Barry, E. A. Lee, and D. G. Messerschmitt, *Digital Communication*, 3rd edition, Kluwer Academic Publishers, 2004, chapter 10.

The sphere detector uses a depth-first approach to find the leaf node with minimum cost. In other words, the sphere detector uses a "greedy" search approach to find the first leaf node, thereby establishing a cost threshold. The sphere detector then begins its depth-first search from that first leaf node. As the sphere detector seeks a lower cost leaf node, any branches leading to nodes whose cost exceeds the threshold are pruned. The pruning is possible because the cost of a particular path can only increase from one level to the next. If a leaf node with a cost below the threshold is found during the search, then that leaf node becomes the preliminary result of the search and the threshold is reduced accordingly. The search continues until each leaf node's path has either been pruned, or its cost has been computed.

All possible channel input vectors are points in space, and the tree-search technique searches through all points to find the one with the lowest cost. The search technique described above is called sphere detection because it does not search through those points outside the hypersphere defined by the value of the initial radius, or the cost of the first leaf node. As leaf nodes with lower costs are found, the radius shrinks thereby reducing complexity by excluding more points from its search. For more information regarding sphere detectors, reference may be had to A. Chan and I. Lee, "A new reduced-complexity sphere decoder for multiple antenna systems," *IEEE Conference on Communications*, pp. 460-464, 2002.

One way to reduce complexity of the sphere detector is to set an initial threshold, which is equivalent to establishing the radius of the hypersphere before any computations are done. For more information regarding setting an initial threshold, reference may be had to W. Zhou, G. B. Giannakis, "Sphere decoding algorithms with improved radius search," *IEEE Communications and Networking Conference*, vol. 4, pp. 2290-2294, March 2004. The risk of setting an initial threshold is that if the hypersphere excludes all points, the radius would have to be expanded and the search continued. On the other hand, if the initial hypersphere contains only a few points then the sphere detector can find the solution with low complexity. The origin of the hypersphere is also important to reducing complexity. Ideally, the distance from the origin to the point with the lowest cost is minimized, so as to exclude as many points as possible from the search. The most common origin for the hypersphere is the point y.

Computing the LLR values for each bit requires a list of candidate vectors, or leaf nodes, not just the one with minimum cost. For example, implementing the ML detector exactly would require at least 2 candidate vectors, and at most $|A_1^N|/2+1$ candidate vectors in order for all possible bit values to be represented in the list of candidate vectors.

One practical problem with the sphere detector is that its complexity has a large variance depending on channel and noise realizations. Accordingly, embodiments of the disclosure involve a novel algorithm with fixed complexity (called the P-SPH detector algorithm) that achieves nearly the same performance as the sphere detector. The idea is to initialize or "prime" the sphere detector by enumerating some candidate vectors before beginning the greedy search. Then the greedy search will stop after it has enumerated a predetermined number of leaf nodes. The final outputs of the P-SPH detector are the list of leaf nodes enumerated and their costs. The P-SPH detector for the case when N=2 (where N is the number of inputs) is the building block for other embodiments when N>2. Therefore, this disclosure will first focus on the P-SPH for the case when N=2. For this case the scores are defined as follows:

$$S_1(\hat{s})=|y_1-R_{1,1}\hat{s}|^2. \quad \text{(Equation 11)}$$

$$S_2\left(\begin{bmatrix}\hat{s}_1\\\hat{s}_2\end{bmatrix}\right) = |y_2 - R_{2,1}\hat{s}_1 - R_{2,2}\hat{s}_2|^2, \quad \text{(Equation 12)}$$

where the i-th best candidate for the first symbol is denoted as $\hat{s}_1^{(i)}$. Similarly, $\hat{s}_2^{(i,j)}$ is the j-th best candidate for the second symbol when the first symbol is equal to $\hat{s}_1^{(i)}$. With this notation, the j-th leaf node enumerated below the i-th best candidate for the first symbol is $\hat{s}^{(i,j)} = [\hat{s}_1^{(i)} \; \hat{s}_2^{(i,j)}]^T$.

During the initialization mode, K leaf nodes are enumerated corresponding to the K best candidates for the first symbol. The K candidates correspond to K branches from the root node to nodes at the second level. The best branch from each of the K second-level nodes to a leaf node is chosen thereby enumerating K leaf nodes. This initialization mode as just described can be viewed as a modified breadth-first tree-search. Besides the set of candidate values for the first symbol, the vectors $c = [c_1 \; c_2 \ldots c_{K+1}]$ and $b = [b_1 \; b_2 \ldots b_K \; 0]$ are also computed during the initialization phase. The vector c contains the costs of each enumerated leaf node and the score of the (K+1)-th best branch at the first level:

$$c_i = \begin{cases} \|y - R\hat{s}^{(i,1)}\|^2 = S_1(\hat{s}_1^{(i)}) + S_2\left(\begin{bmatrix} \hat{s}_1^{(i)} \\ \hat{s}_2^{(i,1)} \end{bmatrix}\right), & i \leq K \\ |y_1 - R_{1,1}\hat{s}_1^{(K+1)}|^2 = S_1(\hat{s}_1^{(K+1)}), & i = K+1 \end{cases} \quad \text{(Equation 13)}$$

The vector b contains the indices of the last branches enumerated for each node belonging to one of the paths of the enumerated leaf nodes. After the initialization mode, $b = [1 \; 1 \ldots 1 \; 0]$. In other words, for each of the first K candidates at the first level only one candidate at the second level has been enumerated.

During the second phase L–K additional leaf nodes are enumerated using a greedy tree-search starting from the leaf node from the initial set with the minimum cost. In the end, the P-SPH detector enumerates L leaf nodes, or candidate vectors. This greedy search enumerates the next best sibling from the leaf node that has already been enumerated with minimum cost, or it enumerates a leaf node below another candidate for the first symbol if its first symbol score is smaller. In other words, the next best leaf node for the i-th candidate of the first symbol is enumerated where $c_i \leq c_j \; \forall j$. As needed, $c_i$ is updated to be the cost of the last leaf node enumerated that contains the i-th candidate of the first symbol, and the corresponding coefficient in b is incremented. If the last element in c is the smallest, then another candidate for the first symbol may be enumerated. The score for the next best candidate for the first symbol is computed and appended to c. Updating the coefficients in b is done by simply incrementing $b_i$ when $c_i \leq c_j \; \forall j$. In alternative embodiments, the P-SPH detector sorts the elements of c in ascending order after each leaf node is enumerated. Note that the coefficients in b keep their correspondence with the elements of c.

In order to reduce complexity further, the maximum number of branches that can be enumerated for the first symbol is $K_{max}$ and the most symbols that can be enumerated from a node at the second level connected to a leaf node is $B_{max}$. Deciding which of the branches to enumerate and their enumeration order is determined by a constellation sorting algorithm. Ideally, the constellation sorting algorithm should output the symbol in the constellation that is the i-th nearest to the input value. In practice, some constellation sorting algorithms may reduce complexity by approximating the ideal algorithm. Constellation sorting algorithms either presently known or that are developed in the future could be implemented to determine the enumeration order.

FIGS. 2A-2B show an initialization mode operation 200 for a P-SPH detector in accordance with embodiments of the disclosure. During the initialization mode, the P-SPH detector enumerates a fixed number of "best" candidate vectors based on a parameter ("K"). In some embodiments, the best candidate vectors can be determined using "cost" and "score" calculations of a breadth-first tree-search algorithm. In FIGS. 2A-2C, N=K=2, L=5 and $K_{max} = B_{max} = \infty$.

As shown in FIG. 2A, a root node 202 has a number of branches 204 exiting from the root node 202. The root node 202 represents a first symbol and the branches 204 represent the number of possible values for the first symbol. Also shown are secondary nodes 206 having a number of branches 208 exiting each secondary node 206. The secondary nodes 206 represent a second symbol and the branches 208 represent the number of possible values for the second symbol. The best leaf node 210A (shown by the bolded path) is enumerated by calculating scores for the paths 204 and the paths 208 (see Equations 11-13). The cost 212A of the best leaf node 210A ($\hat{s}^{(1,1)}$) below the best candidate for the first symbol ($\hat{s}_1^{(1)}$) is calculated as $c_1 = S_1(\hat{s}_1^{(1)}) + S_2(\hat{s}^{(1,1)})$. In other words, the cost 212A is the sum of a path ($S_1(\hat{s}_1^{(1)})$) exiting the root node 202 plus the score of a path ($S_2(\hat{s}^{(1,1)})$) exiting the secondary node 206. Each leaf node that is enumerated (e.g., leaf node 210A represents the vector $\hat{s}_1$) and its cost are stored as part of an output list. In this case, $L(1) = \hat{s}^{(1,1)}$ and $L_C(1) = c_1$. In at least some embodiments, a table 214 is used to sort the costs of each of the branches 204, 208 that have the potential to be enumerated next. If sorting is enabled, then the vector i is initialized as $i = [i_1 \; i_2 \ldots i_{K+1}] = [1 \; 2 \ldots K+1]$. As shown, the table 214 stores and updates values for the vector c and the vector b. In at least some P-SPH detector embodiments, registers are used to implement the table 214.

FIG. 2B shows that a first leaf node 210B ($\hat{s}^{(2,1)}$) below the second best candidate for the first symbol ($\hat{s}_1^{(2)}$) is determined during the initialization mode. This is the second best leaf node. The second best leaf node 210B is enumerated by calculating scores for the paths 204 and the paths 208 (see Equations 11-13). The cost 212B of the second best leaf node 210B is calculated as $c_2 = S_1(\hat{s}_1^{(2)}) + S_2(\hat{s}^{(2,1)})$. In other words, the cost 212B is the sum of the score of a path ($S_1(\hat{s}_1^{(2)})$) exiting the root node 202 plus the score of a path ($S_2(\hat{s}^{(2,1)})$) exiting the secondary node 206. This second leaf node is added to the output list as $L(2) = \hat{s}^{(2,1)}$ and its cost is also stored as $L_C(2) = c_2$. As shown, the table 214 stores and updates values for the vector c and the vector b. The values in the table 214 can be compared and sorted. Specifically, if $c_1 > c_2$ then the position of the first two values in the vectors c and b are swapped. In the example shown in FIG. 2B, $c_1 < c_2$ so the vector i remains unchanged.

Figure 3D:
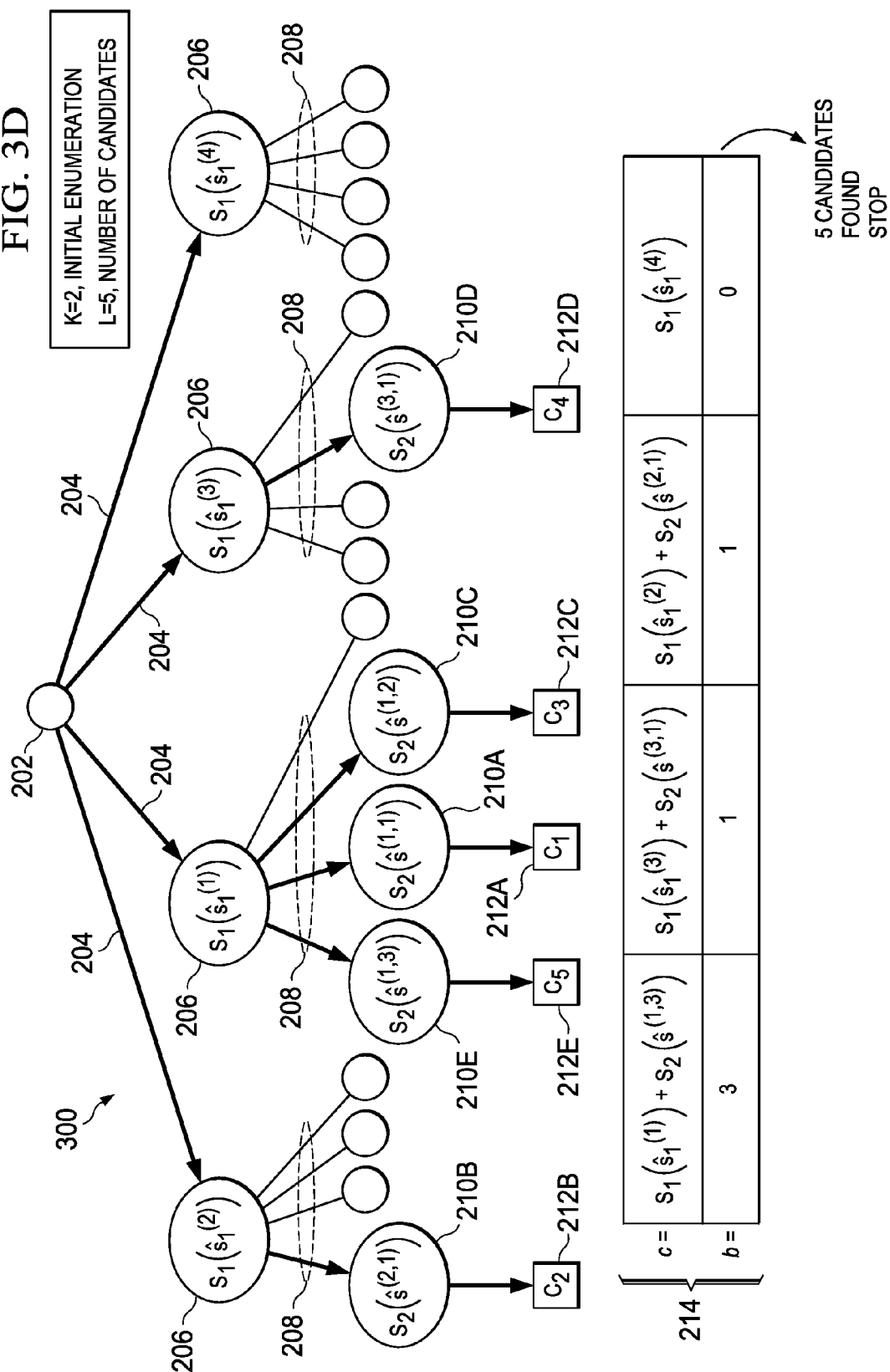

FIGS. 3A-3D show a completion mode operation 300 after the initialization mode for the P-SPH detector of FIGS. 2A-2B in accordance with embodiments of the disclosure. FIG. 3A shows the first step of the completion mode (where K=2). The score of the third best candidate for the first symbol ($\hat{s}_1^{(3)}$) is computed and stored in the third element of the vector c (i.e., $c_3 = S_1(\hat{s}_1^{(3)})$). The score of a path ($S_1(\hat{s}_1^{(3)})$) exiting the root node 202 can be compared to the cost ($c_2$) of the second leaf node 210B during the completion mode. As shown, the table 214 stores and updates values for the vector c and the vector b. The elements of the vector c are sorted in ascending order, and the elements of the vector b are reordered accordingly as shown in table 214. In the example of FIG. 3A, $c_2 > c_3$ and thus the sorting is implemented as shown with $i = [1 \; 3 \; 2]$.

In FIG. 3B, a third best leaf node 210C is determined during the completion mode. During the completion mode, the next leaf node enumerated uses the $i_1$-th best candidate value of the first symbol. According to our notation this leaf node is labeled as $\hat{s}^{(i_1 b_1+1)}$. For the example shown in FIG. 3B, $i_1=1$ and $b_1=1$ so the next leaf node enumerated will be $\hat{s}^{(1,2)}$. The score for this leaf node is computed as $c_1=S_1(\hat{s}_1^{(1)})+S_2(\hat{s}^{(1,2)})$. The output list is updated as $L(3)=\hat{s}^{(1,2)}$ and the lists of costs is updated as $L_c(3)=c_1$. As shown in FIG. 3B, the table 214 stores and updates values for the vector c and the vector b. At this point $c=[S_1(\hat{s}_1^{(1)})+S_2(\hat{s}^{(1,2)}), S_1(\hat{s}_1^{(3,1)}), S_1(\hat{s}_1^{(2)})+S_2(\hat{s}^{(2,1)})]$ and $b=[2\ 0\ 1]$. After each new leaf node's score is computed the vectors c, b, and i are sorted according to c. In this example, before sorting $c_2<c_1<c_3$ so after sorting $i=[3\ 1\ 2]$. The completion mode continues until L leaf nodes have been enumerated.

In FIG. 3C, a fourth best leaf node 210D is determined during the completion mode. The fourth best leaf node 210D is enumerated by calculating scores for the paths 204 and the paths 208. At this point, $i_1=3$ and $b_1=0$ so the next leaf node enumerated will be $\hat{s}^{(3,1)}$ and its cost is computed as $c_1=S_1(\hat{s}_1^{(3)})+S_2(\hat{s}^{(3,1)})$. At this point, $c=[S_1(\hat{s}_1^{(3)})+S_2(\hat{s}^{(3,1)}), S_1(\hat{s}_1^{(1)})+S_2(\hat{s}^{(1,2)}), S_1(\hat{s}_1^{(2)})+S_2(\hat{s}^{(2,1)})]$ and $b=[1\ 2\ 1]$. The output list is updated as $L(4)=\hat{s}^{(3,1)}$ and the list of costs is updated as $L_C(4)=c_1$. Since the last leaf-node was enumerated using the (K+1)-th best candidate for the first symbol, the score for another candidate of the first symbol is computed and stored in the vector c. Specifically, $c_4=S_1(\hat{s}_1^{(4)})$ and $b_4=0$. In this example, before sorting $c_2<c_1<c_3<c_4$ so after sorting $i=[1\ 3\ 2\ 4]$.

In FIG. 3D, a fifth best leaf node 210E is determined during the completion mode. The fifth best leaf node 210E is enumerated by calculating scores for the paths 204 and the paths 208. At this point, $i_1=1$ and $b_1=2$ so the next leaf node enumerated will be $\hat{s}^{(1,3)}$ and its cost is computed as $c_1=S_1(\hat{s}_1^{(1)})+S_2(\hat{s}^{(1,3)})$. At this point, $c=[S_1(\hat{s}_1^{(1)})+S_2(\hat{s}^{(1,3)}), S_1(\hat{s}_1^{(3)})+S_2(\hat{s}^{(3,1)}), S_1(\hat{s}_1^{(2)})+S_2(\hat{s}^{(2,1)}), S_1(\hat{s}_1^{(4)})]$ and $b=[3\ 1\ 1\ 0]$. The output list is updated as $L(5)=\hat{s}^{(1,3)}$ and the list of costs is updated as $L_C(5)=c_1$. Once five candidate vectors have been enumerated (L=5), the P-SPH detector stops and outputs the list of candidate vectors and the list of their costs.

Figure 4A:
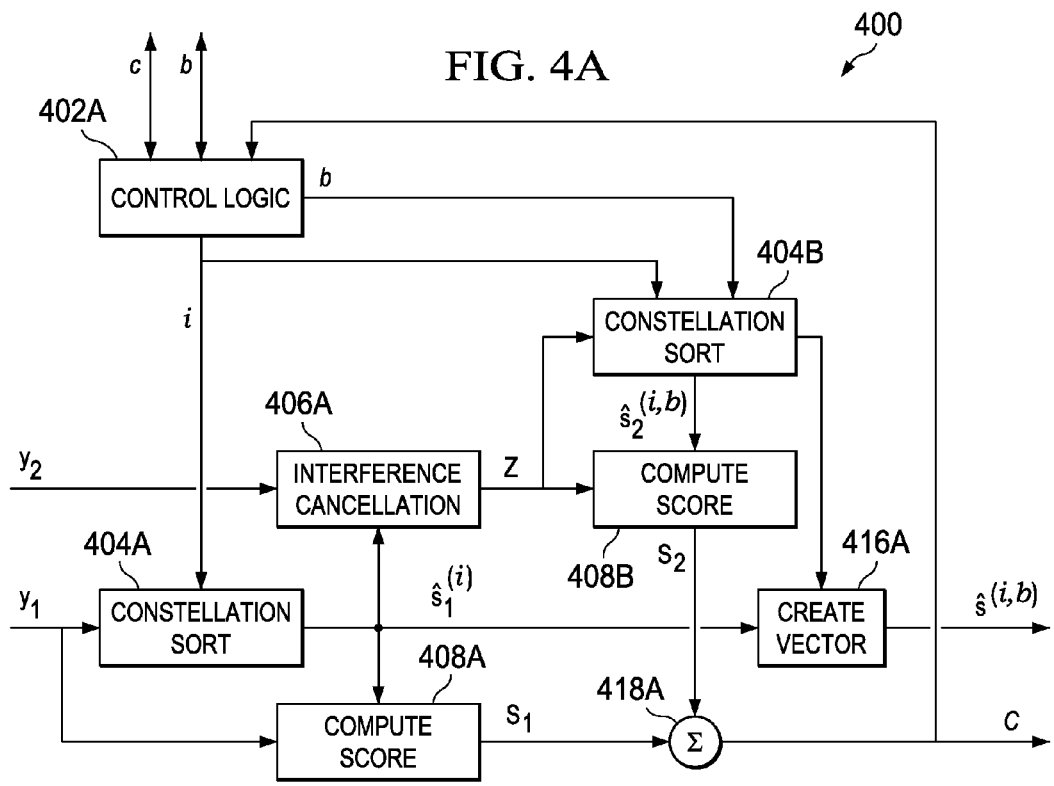
FIG. 4A shows a block diagram of a P-SPH detector in accordance with embodiments of the disclosure.

FIG. 4A shows a block diagram of a P-SPH detector 400 in accordance with embodiments of the disclosure when N=2 (where N is the number of inputs). For FIG. 4A, the inputs $y_1$ and $y_2$ are the two outputs of the MIMO equalizer as defined in Equation 4. These inputs are the result of further receiver processing as well. For example, the original received signal is typically converted to a baseband signal, and an OFDM demodulator may have been used so that the two inputs $y_1$ and $y_2$ are from a single subcarrier. The P-SPH detector 400 is configured to search for and to output a list of candidates ($L_S$) and their corresponding scores ($L_C$). The sets $L_S$ and $L_C$ can be used to detect symbols, or generate symbol estimates. During an initialization mode, the P-SPH detector 400 enumerates a fixed number of "best" candidate vectors based on a parameter ("K"). In FIG. 4A, the control logic 402A, the constellation sort modules 404A and 404B, the interference cancellation module 406A, the compute score modules 408A and 408B, and the create vector module 416A operate together to search for a best candidate, a second best candidate and so on until the K best candidates and their scores have been determined. Once the K best candidate vectors have been determined, the P-SPH detector 400 enters the completion mode. During the completion mode, the P-SPH detector 400 enumerates additional candidate vectors until L candidate vectors have been enumerated. In at least some embodiments, the additional candidate vectors are enumerated using a greedy search that starts with the leaf node having the lowest cost as determined during the initialization mode.

In FIG. 4A, the control logic 402A decides which of the candidates of the first symbol to use to enumerate the next leaf node. As shown, the output i of the control logic 402A indicates the i-th best candidate of the first symbol is used. The control logic 402A also outputs b which indicates the b-th best candidate for the second symbol is used. The constellation sort module 404A then outputs $\hat{s}_1^{(i)}$ which is the i-th best candidate for the first symbol to be used by the interference cancellation block 406A, the create vector module 416A, and the compute score module 408A. The interference cancellation block 406 performs the procedure described by Equation 10 ($z=y_2-R_{2,1}\hat{s}_1^{(i)}$). The constellation sort module 404B uses the output (z) of the interference cancellation block 406A and the outputs (i and b) of the control logic 402A to decide which candidate for the second symbol to enumerate next ($\hat{s}_2^{(i,b)}$). Depending on the specific implementation of the constellation sort 404B, the input i may or may not be used. The first score is computed according to Equation 11 as $S_1=|y_1-R_{1,1}\hat{s}_1^{(i)}|^2$ in the compute score module 408A. The second score is comuted according to Equation 12 as $S_2=|y_2-R_{2,1}\hat{s}_1^{(i)}-R_{2,2}\hat{s}_2^{(i,b)}|^2$ in the compute score module 408B. The two symbols $\hat{s}_1^{(i)}$ and $\hat{s}_2^{(i,b)}$ are combined by the create vector module 416A to create the candidate vector that is output as $\hat{s}^{(i,b)}=[\hat{s}_1^{(i)}\ \hat{s}_2^{(i,b)}]^T$. The output (C) is the cost of the candidate vector, which is the sum of the two scores $C=S_1+S_2$. Each of these outputs is accumulated into the list of candidate vectors $L_S$ and their list of costs $L_C$.

Figure 4B:
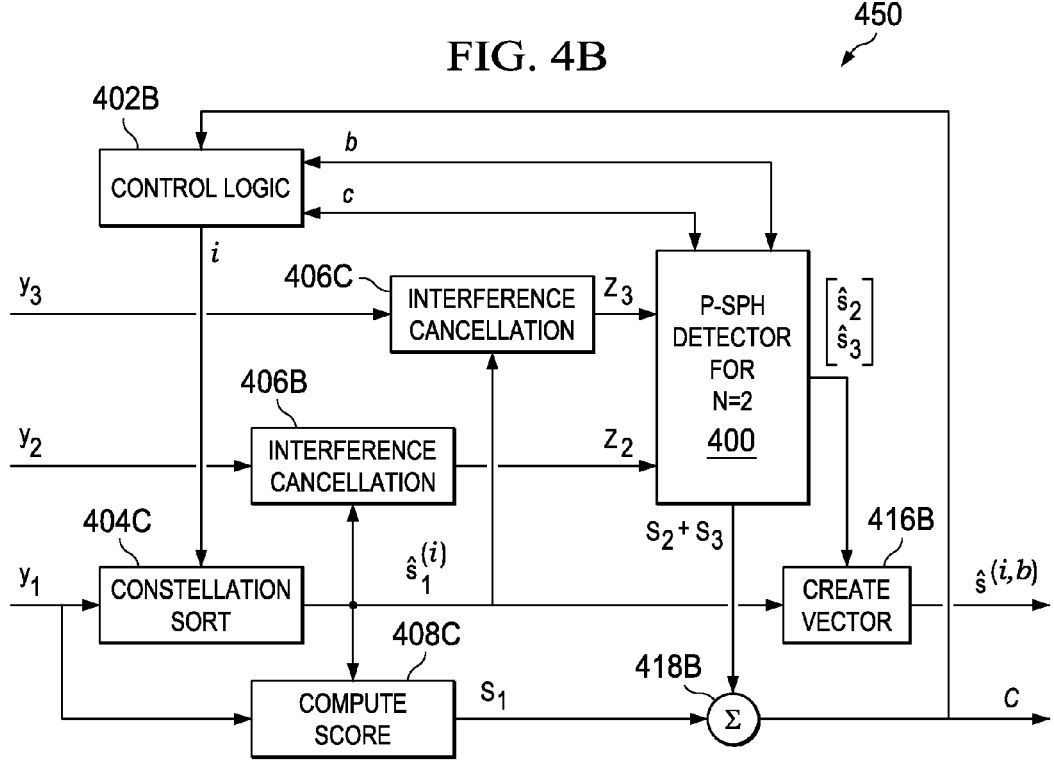
FIG. 4B shows a block diagram of a P-SPH detector for N=3 in accordance with embodiments of the disclosure.

FIG. 4B shows a block diagram of a P-SPH detector 450 for N=3 (where N is the number of inputs). The P-SPH detector 450 employs the P-SPH detector 400 for N=2 as a building block to create a P-SPH detector for N=3. The P-SPH detector 450 operates as described for the P-SPH detector 400, but with an additional input $y_3$ and corresponding logic and modules to search for and to output a list of candidates ($L_S$) and their corresponding costs ($L_C$). In summary, the control logic 402B, the constellation sort module 404C, the interference cancellation modules 406B and 406C, the compute score modules 408C, and the create vector module 416B operate together with the components of the P-SPH detector 400 to search for a best candidate, a second best candidate and so on until the K best candidates and their scores have been determined in the initialization mode. Once the K best candidate vectors have been determined, the P-SPH detector 450 enters the completion mode. During the completion mode, the P-SPH detector 450 enumerates additional candidate vectors until L candidate vectors have been enumerated. In at least some embodiments, the additional candidate vectors are enumerated using a greedy search that starts with the leaf node having the lowest cost as determined during the initialization mode. The P-SPH detector concept can be generalized to any size N, so that a P-SPH detector designed for N−1 is applied to each of the sub-trees extending below each enumerated candidate for the first symbol. Therefore, as the P-SPH detector for N=2 is applied recursively, a P-SPH detector can be made for any N.

In accordance with some embodiments, the flow of the P-SPH detector algorithm when N=2 and the l-th best leaf-node is computed as follows. This processing would be repeated for l=1 to L, and the outputs would correspond to the l-th element of the sets $L_S$ and $L_C$, $L_S(l)$ and $L_C(l)$, respectively.

Input Parameters:
K=number of candidates for first symbol to enumerate during initialization;
l=indicates that the l-th best leaf-node and its score should be computed;
$K_{max}$=maximum number of candidates for the first symbol that may be enumerated; and
$B_{max}$=maximum number of candidates for the second symbol that may be enumerated.

c=[$c_1, c_2, \ldots C_{Kmax}$] vector of costs used to store the current state of the P-SPH detector b=[$b_1, b_2, \ldots b_{Kmax}$] vector of counters for the number of leaf-nodes enumerated for each candidate of the first symbol.

P=index of last candidate of the first symbol to be considered.

Outputs:

$\hat{s}_l$=the l-th best leaf node.

C=the cost of the l-th best leaf node.

Steps in the flow of the P-SPH detector.

1. if l=1, then reset the variables or registers c and b.
   Set $c_i$=∞, or largest possible number for i=1 to $K_{max}$.
   Set $b_i$=0 for i=1 to $B_{max}$.
2. if l≦K, then generate the next outputs from the initialization mode.
   (if l≦K, then jump to step 4)
3. if l>K, then generate the next outputs from the completion mode.
   (if l>K, them jump to step 10)

For Initialization Mode:
4. Set i=l.
5. Set b=1.
6. Set P=l.
7. If l<K or l+1>$K_{max}$, then jump to step 15.
8. P=l+1
9. jump to step 12.

For Completion Mode:
10. Compute $$i = \underset{k=1\ldots K_{\max}}{\operatorname{argmin}} (c_k).$$

11. Set b=$b_i$.
12. If $C_P$<∞, then jump to step 15.
13. Use a constellation sort to get the P-th best candidate for the first symbol $\hat{s}_1^{(P)}$. Typically, $\hat{s}_1^{(P)}$ is the P-th nearest symbol in the alphabet to $y_1/R_{11}$.
14. Compute and store the partial score $c_P=|y_1-R_{1,1}\hat{s}_1^{(P)}|^2$.
15. Use a constellation sort to get the i-th best candidate for the first symbol $\hat{s}_1^{(i)}$. Typically, $\hat{s}_1^{(i)}$ is the i-th nearest symbol in the alphabet to $y_1/R_{11}$.
16. Cancel the interference due to $\hat{s}_1^{(i)}$ from $y_2$, $z=y_2-R_{21}\hat{s}_1^{(i)}$.
17. Compute the score of the first symbol. $S_1=|y_1-R_{1,1}\hat{s}_1^{(i)}|^2$.
18. Use a constellation sort to determine the b-th best candidate for the second symbol $\hat{s}_2^{(i,b)}$. Typically, $\hat{s}_2^{(i,b)}$ is the nearest symbol in the alphabet to $z/R_{22}$.
19. Compute the second score. $S_2=|y_2-R_{2,1}\hat{s}_1^{(i)}-R_{2,2}\hat{s}_2^{(i,b)}|^2$.
20. Compute and store the final cost $c_i=S_1+S_2$.
21. Set the outputs $$\hat{s}_l = \hat{s}^{(i,b)} = \begin{bmatrix} \hat{s}_1^{(i)} \\ \hat{s}_2^{(i,b)} \end{bmatrix}$$

and its cost C=$c_i$.

22. Increment the variable or register that counts the number of leaf-nodes enumerated for each candidate of the first symbol, $b_i=b_i+1$.
23. if $b_i+1<B_{max}$, jump to step 25.
24. No more leaf nodes for the i-th best candidate of the first symbol may be enumerated. Set $c_i$=∞.
25. if i≠P then jump to step 28.
26. if P≧$K_{max}$, jump to step 28.
27. Prepare the P-SPH to compute the first score of another candidate for the first symbol in case it is called again. Set P=P+1.
28. All the outputs have been stored, the P-SPH is ready to exit.

Another embodiment of the P-SPH detector reduces the amount of memory storage required by keeping the number of elements in {$c_k$} constant. This may be implemented by changing Step 14 as follows:

Alternative Step 14:

14a. Find the index of the maximum element in $$\{c_k\}, j = \underset{k=1\ldots K_{\max}}{\operatorname{argmax}} (c_k)$$

14b. Compute and store the partial score $c_j=|y_1-R_{1,1}\hat{s}_1^{(P)}|^2$.

14c. Set $b_j$=0

Figure 5:
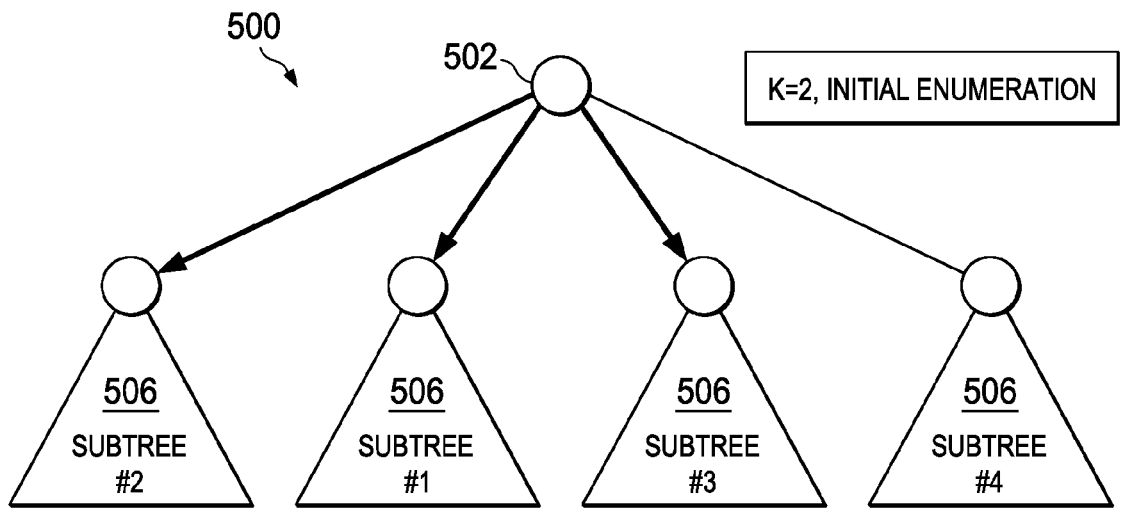
FIG. 5 shows a block diagram of a P-SPH detector in accordance with alternative embodiments of the disclosure.

FIG. 5 shows a generalized tree diagram in accordance with embodiments of the disclosure. For FIG. 5, N=K=2. As shown in FIG. 5, each candidate for a first symbol node 502 leads to a sub-tree 506 having N−1 levels. In general, each of the branches enumerated from the first level of the tree spawns its own sub-tree. Another leaf node is enumerated within the sub-tree whose last leaf node had the smallest cost using a tree-search algorithm. Any tree-search algorithm may be used. If the partial score from the (K+1)-th best candidate is smaller than all the last leaf nodes from the other sub-trees, then the next leaf node is enumerated from the sub-tree below the (K+1)-th branch at the first level of the tree. The partial score for the next best candidate for the first symbol is computed as long as fewer than $K_{max}$ candidates have been enumerated. This process is continued until L leaf nodes have been enumerated. The path and cost of each leaf node enumerated during execution of the algorithm is stored in the sets $L_S$ and $L_C$, respectively.

Figure 6:
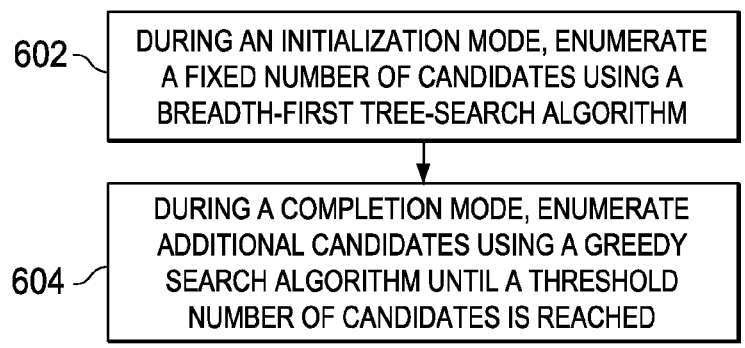
FIG. 6 shows a generalized tree diagram in accordance with embodiments of the disclosure.

FIG. 6 shows a method 600 in accordance with embodiments of the disclosure. As shown in FIG. 6, the method 600 comprises, during an initialization mode, enumerating a fixed number of candidates ("K") by using a breadth-first tree-search algorithm (block 602) in each of the sub-trees below the K best candidates for the first symbol. The method 600 further comprises, during a completion mode, enumerating additional candidates using a greedy search algorithm until a threshold number of candidates ("L") is reached. The method 600 may also comprise other steps such as storing and sorting candidates vectors and their corresponding costs. The tree-search used to compute the next best leaf node for one the sub-trees could use many different algorithms. The only condition is that the tree-search algorithm output the next best leaf node from that sub-tree when required. Many existing MIMO detectors can easily be modified for this purpose as one skilled in the art can understand. In particular, the P-SPH detector disclosed herein can be used. If N=3, then a P-SPH detector designed for N=2 can be applied to each of the sub-trees.

As presented here the P-SPH detector uses a serial implementation. Alternatively, embodiments of the P-SPH detector could increase the amount of computations done in parallel. One way to accomplish this is to enumerate n leaf nodes at once, instead of the one-by-one enumeration described above (n=1). This would allow more operations to be done in parallel. Specifically, instead of enumerating the single next best branch for the i-th candidate of the first symbol ($c_i \leq c_j$), enumerate n new leaf nodes. This could be done either by enumerating one new leaf node from each sub-tree corresponding to the n smallest elements in $\{c_j\}$, or enumerating n new leaf nodes for the i-th sub-tree. For example, consider the P-SPH detector when N=2. In the serial implementation the L best leaf nodes are computed one-by-one. Alternatively, the initialization mode of the parallel implementation could simultaneously enumerate the n best candidates of the first symbol until K leaf nodes are generated. Then the completion mode of the parallel implementation could simultaneously enumerate the next best leaf node for the n candidates of the first symbol that correspond to the n smallest elements in the vector c. As the parameter n increases, the parallel implementation suffers more and more performance loss compared to the serial implementation. However, for small values of n the performance loss can be acceptable in order to achieve the complexity savings.

Instead of repeatedly searching for the maximum and/or minimum element in the set $\{c_j\}$, another embodiment it so keep the elements sorted so that the index of the maximum and/or minimum are known. This requires maintaining the association between the sub-trees and the elements of the sets $\{c_j\}$ and $\{b_j\}$.

In at least some embodiments, various parameters can be adapted to provide many different versions of the P-SPH detector that achieve various performance-complexity trade-offs. For example, four parameters ($L$, $K$, $K_{max}$, $\{B_{max,i}\}$) of the P-SPH detector and two parameters in the QR decomposition ($\alpha$ and $\Pi$) be adapted. As an example, when K=1, $K_{max}=|A_1|$ and $B_{max}=|A_2^N|$, the P-SPH detector is equivalent to a sphere detector that stops after it has enumerated L leaf nodes. This detector is referred to as a truncated-sphere detector in D. W. Waters, "Signal Detection Strategies and Algorithms for Multiple-input Multiple-Output Channels", Georgia Institute of Technology, PhD Dissertation, December 2005. Alternatively, when $K_{max}=|A_1|$, $B_{max}=|A_2^N|$, $L=|A_1^N|$, and a=0, the P-SPH detector is equivalent to an ML detector for any valid value of K (where $1 \; K \; |A_1|$) and $\Pi$. Alternatively, when $K=K_{max}=B_{max}=L=1$, the P-SPH detector is equivalent to a decision-feedback detector.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A Multiple-input Multiple-Output (MIMO) receiver, comprising:
    at least one antenna for receiving a plurality of signals;
    a parameterized sphere detector having two search modes for determining candidate vectors to detect symbols to be used to decode bits of an at least one of the received signals,
    wherein, during a first initialization search mode, the parameterized sphere detector enumerates a number of best candidate vectors up to a fixed parameter value, and
    wherein, during a second search mode, the parameterized sphere detector enumerates additional candidate vectors using a cost calculation and a score calculation of a greedy search until a predetermined number of candidate vectors have been enumerated.

2. The MIMO receiver of claim 1 wherein the parameterized sphere detector uses a breadth-first tree-search algorithm to search for candidate vectors during the first search mode.

3. The MIMO receiver of claim 1 wherein the parameterized sphere detector stores and updates a table having enumerated candidate vectors and their associated costs.

4. The MIMO receiver of claim 3 wherein the parameterized sphere detector sorts the enumerated candidate vectors stored in the table based on their associated costs.

5. The MIMO receiver of claim 1 wherein the parameterized sphere detector computes and stores a partial score for a branch corresponding to one of the best candidate vectors.

6. The MIMO receiver of claim 1 wherein the parameterized sphere detector overwrites a stored leaf node score if a better leaf node score is computed.

7. The MIMO receiver of claim 1 wherein the parameterized sphere detector prevents enumeration of leaf nodes from a given sub-tree if more than a threshold number of leaf nodes have been enumerated for that sub-tree.

8. The MIMO receiver of claim 1 wherein, if a previous enumerated leaf node came from a partial path, the parameterized sphere detector enumerates another partial path for a first symbol as long as a maximum number of candidate vectors for the first symbol have not been enumerated.

9. The MIMO receiver of claim 1 wherein the parameterized sphere detector uses different independent tree-search algorithms for different sub-trees.

10. The MIMO receiver of claim 1 wherein the parameterized sphere detector calculates the candidate vectors in series.

11. The MIMO receiver of claim 1 wherein the parameterized sphere detector calculates the candidate vectors in parallel.

12. The MIMO receiver of claim 1 wherein the parameterized sphere detector is configured to operate based on two equalized inputs.

13. The MIMO receiver of claim 1 wherein the parameterized sphere detector recursively applies at least one parameterized sphere detector configured to handle two equalized inputs.

14. A method, comprising:
    initializing a parameterized sphere detector to enumerate a fixed number of best candidate vectors before beginning a greedy search; and
    enumerating additional candidate vectors using a cost calculation and a score calculation of the greedy search until a threshold number of candidate vectors is reached; and
    using the candidate vectors to detect a plurality symbols in order to decode bits of a received signal.

15. The method of claim 14 wherein said initializing involves a breadth-first tree-search algorithm.

16. The method of claim 14 further comprising storing and sorting enumerated candidate vectors based on their associated costs.

17. The method of claim 14 further comprising recursively applying at least one parameterized sphere detector configured to handle two equalized inputs.

* * * * *